US005883371A

United States Patent [19]

Meeker

[11] Patent Number: 5,883,371

[45] Date of Patent: Mar. 16, 1999

[54] DIGITAL DEPOSIT AND DISPENSING SAFE

[75] Inventor: Scott H. Meeker, Temecula, Calif.

[73] Assignee: Phelps-Tointon, Inc., Vista, Calif.

[21] Appl. No.: 589,012

[22] Filed: Jan. 19, 1996

Related U.S. Application Data

[63] Continuation-in-part of Ser. No. 543,477, Oct. 16, 1995, Pat. No. 5,725,081.

[51] Int. Cl.[6] .................... G06F 17/00

[52] U.S. Cl. .................... 235/379; 235/375

[58] Field of Search .................... 235/379, 375; 902/9, 11, 12, 13

[56] References Cited

U.S. PATENT DOCUMENTS

| | | | |
|---|---|---|---|
| 452,635 | 5/1891 | Dieterich . | |
| 789,086 | 5/1905 | Diebel . | |
| 1,778,883 | 10/1930 | Norris . | |
| 2,311,632 | 2/1943 | Berger et al. . | |
| 2,508,159 | 5/1950 | Haas . | |
| 2,922,546 | 1/1960 | Trulaske | 221/133 |
| 2,923,587 | 2/1960 | Zipf | 346/22 |
| 3,593,881 | 7/1971 | Paap | 221/3 |
| 3,648,020 | 3/1972 | Tateisi et al. | 235/61.7 |
| 3,806,710 | 4/1974 | Shigemori et al. | 235/92 |
| 3,963,900 | 6/1976 | Sawaguchi et al. | 235/61.7 |
| 4,000,800 | 1/1977 | Loucks, Sr. | 194/9 |
| 4,190,066 | 2/1980 | Burnside | 133/4 R |
| 4,313,601 | 2/1982 | Graef et al. | 271/207 |
| 4,418,555 | 12/1983 | Uyeda | 70/366 |
| 4,447,714 | 5/1984 | Lundblad | 235/379 |
| 4,469,245 | 9/1984 | Fish et al. | 221/225 |
| 4,554,444 | 11/1985 | Hirose | 235/379 |
| 4,663,621 | 5/1987 | Field et al. | 340/825.31 |
| 4,717,044 | 1/1988 | Suzuki et al. | 221/130 |
| 4,745,784 | 5/1988 | Gartner | 70/277 |
| 4,874,931 | 10/1989 | Oka et al. | 235/379 |
| 4,877,235 | 10/1989 | Robinson | 271/279 |
| 4,883,183 | 11/1989 | Kimura et al. | 235/379 |
| 4,899,562 | 2/1990 | Gartner et al. | 70/277 |
| 4,922,837 | 5/1990 | McGunn | 109/46 |
| 4,927,055 | 5/1990 | Groover | 221/67 |
| 4,940,162 | 7/1990 | Thie | 221/129 |
| 5,110,009 | 5/1992 | Gartner et al. | 221/266 |
| 5,220,157 | 6/1993 | Martin et al. | 235/379 |
| 5,340,967 | 8/1994 | Martin et al. | 235/379 |
| 5,553,320 | 9/1996 | Matsuura et al. | 235/379 |
| 5,561,281 | 10/1996 | Eda et al. | 235/379 |
| 5,742,034 | 4/1998 | Meeker | 235/379 |
| 5,777,304 | 7/1998 | Awatsu et al. | 235/379 |

FOREIGN PATENT DOCUMENTS 2217073 10/1989 United Kingdom .

OTHER PUBLICATIONS

Armor Safe Technologies[1] "The Treasury Digital Deposit and Dispensing Safe", Copyright 1993. No month.

Armor Safe Technologies[1] "PosiCache Digital Deposit and Dispensing Safe", Copyright 1994. no month.

Armor Safe Technologies[1] "ChangeBank Digital Dispensing Safe", Copyright 1993. no month.

Centurion Deposit Corporation, TSBD 2018 Multi "Shutter–Slot" Depository, 1986. no month.

Tidel Engineering, Inc., Carrollton, Texas, "This Doesn't Seem like Much Now", TACC Cash Dispensers (Referenced in Martin patents '157 and '967), 1993. no month.

Tidel Engineering, Inc., Carrollton, Texas, "Still Taking Chances With Your Cash Management", TACC Cash Deposit and Dispensing Safe (Referenced in Martin patents '157 and '967), 1993. no month.

*Primary Examiner*—Anita Pellman Gross
*Assistant Examiner*—Mark Tremblay
*Attorney, Agent, or Firm*—Juettner Pyle Piontek & Underwood

[57] ABSTRACT

A chamber has a safe and a bill receiver for validating bills of various denominations and for signaling the denomination of each bill. A cash dispenser mounted on the chamber dispenses cartridges containing units of cash one at a time in response to the bill denomination signal. An electronic cash control system is mounted within the safe and includes software for recording each deposit into the bill receiver, recording each withdrawal from the cash dispenser, and providing detailed reports of all such transactions.

8 Claims, 8 Drawing Sheets

2/8
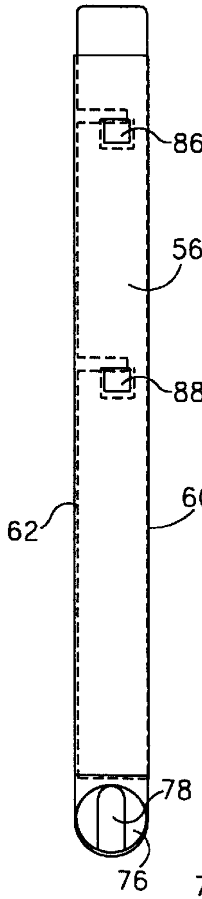
FIG. 4
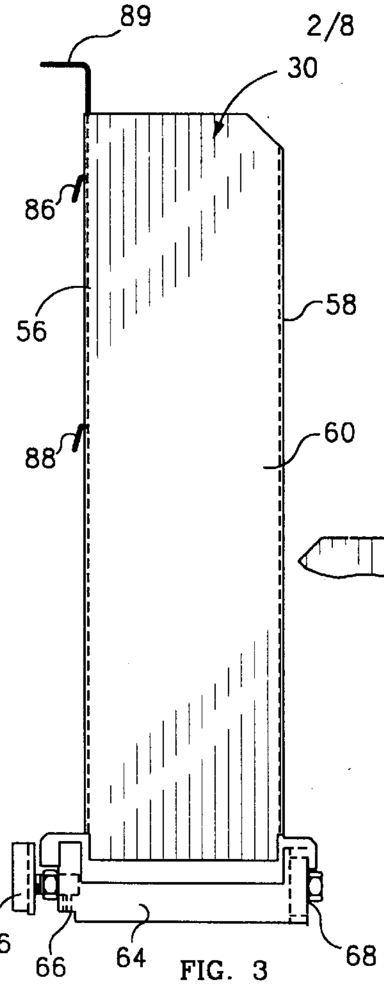
FIG. 3
FIG. 2
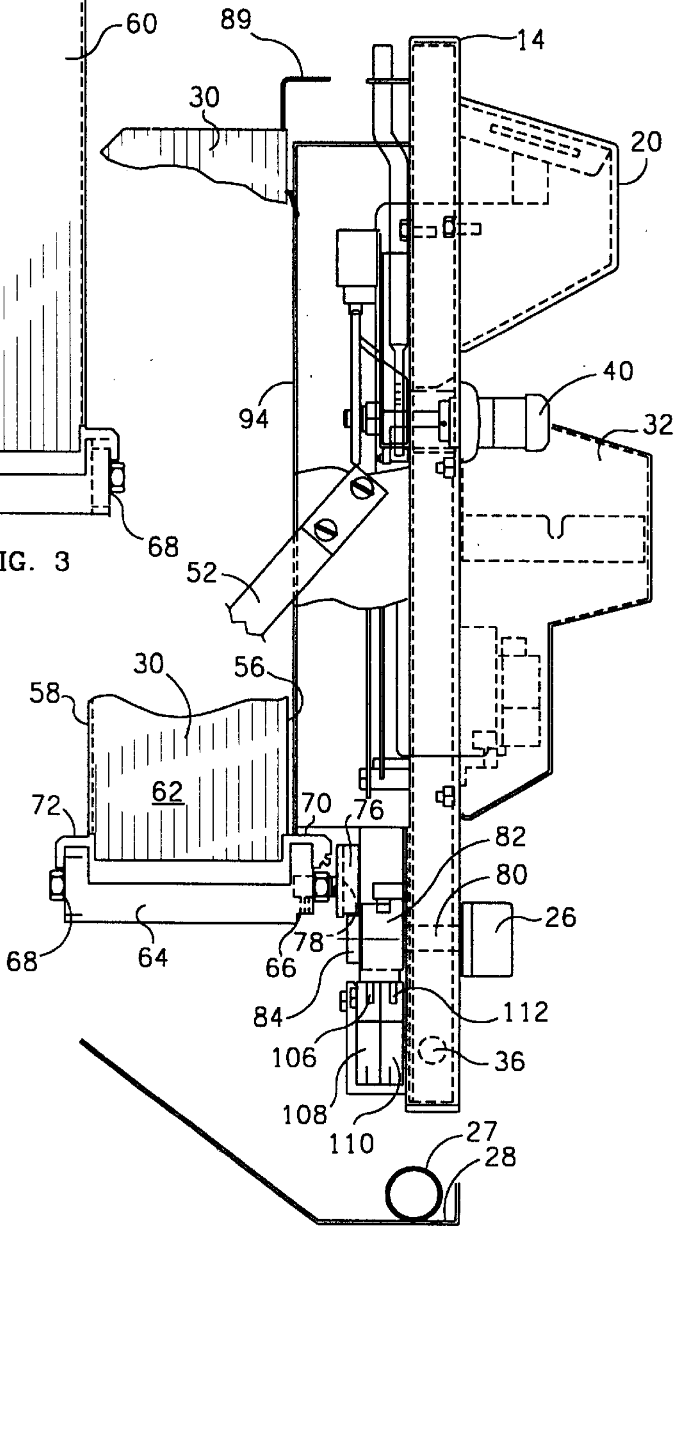

FIG. 7
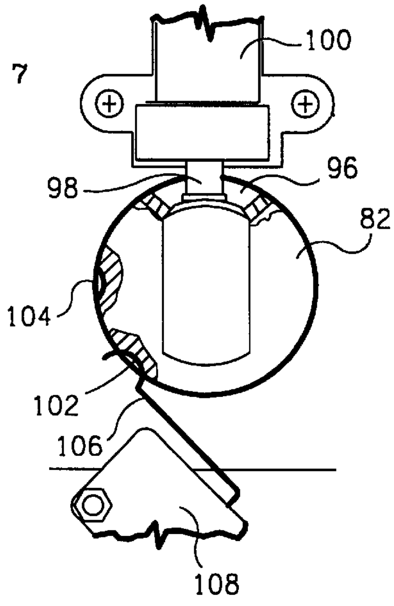
FIG. 9
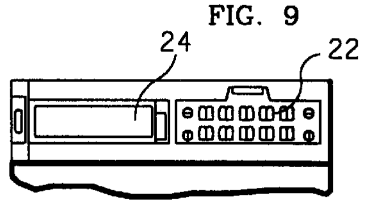
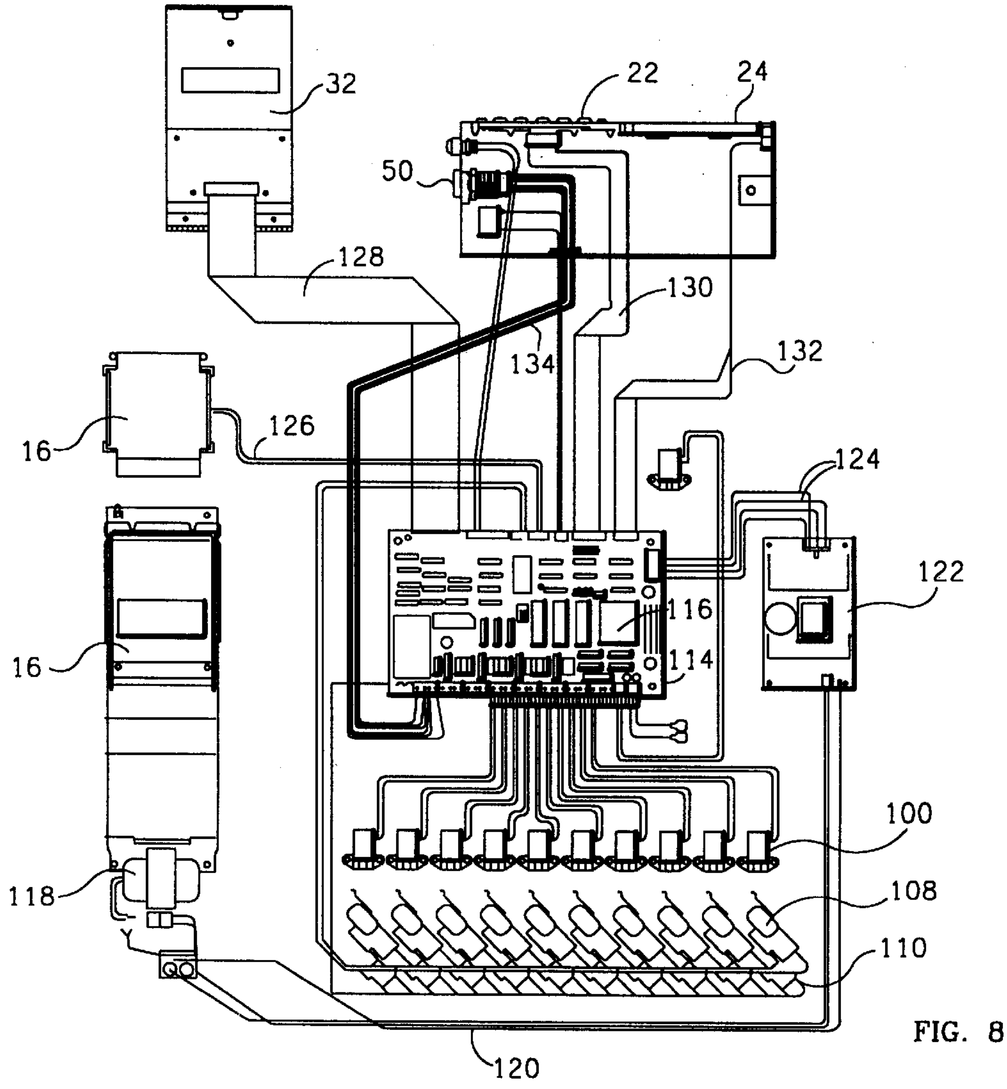
FIG. 8

DIGITAL DEPOSIT AND DISPENSING SAFE

CROSS REFERENCE

This application is a continuation-in-part of copending application Ser. No. 08/543,477, filed Oct. 16, 1995, now U.S. Pat. No. 5,725,081.

FIELD OF THE INVENTION

The present invention relates to money receiving and dispensing machines and pertains particularly to a combined cash deposit and dispensing safe incorporating cash control and accounting systems.

BACKGROUND

Business establishments which handle a large number of cash transactions require a large amount of coins and small bills to make change. Minimum amounts of coins and small bills are normally maintained in the cash registers to make change. Accumulated cash in the form of bills are periodically transferred to a safe to reduce the risk in the event of robbery. Some of the bills are exchanged for smaller, denominations and coins, and some merely deposited for security. However, in each instance, a responsible person such as a manager or head cashier must be available to access the safe and dispense the necessary cash for change.

Systems have recently been developed which can dispense a certain amount of cash to cashiers. However, none of these systems have the ability to receive cash and account for the cash deposited and dispensed. Many of these systems also fail to provide adequate security to prevent embezzlement or theft of funds.

Therefore, there is a need for a reliable and effective system for safekeeping, receiving, dispensing and accounting for cash used in businesses.

SUMMARY AND OBJECTS OF THE INVENTION

It is the primary object of the present invention to provide a reliable and effective system for safekeeping, receiving, dispensing and accounting of cash.

In accordance with one aspect of the present invention, a combination money deposit and dispensing safe comprises a generally box-like housing having walls defining a safe chamber for securing money, a bill receiving unit mounted in said front of said safe and having means for receiving and validating bills of various denominations and generating a signal in proportion to the demonination of each validated bill, a cash dispensing unit mounted in said front of said safe and having means responsive to said signal to enable the dispensing of cash proportionate to said signal, and a manually operable dispensing tray for dispensing an enabled unit of cash.

In accordance with a further aspect of the invention, the above-described combination money deposit and dispensing safe is equipped with means to enable a number of individually identified persons to deposit money into and/or to receive money from the safe and to provide an accounting by individual, by transaction and by total transactions of the money deposited into and dispensed from the safe.

Yet another feature of the invention is to enable respective individuals to make deposits only, or to make deposits and withdrawals in equal amounts only, or to make deposits and withdrawals in unequal amounts, or to make withdrawals with or without an accompanying deposit.

BRIEF DESCRIPTION OF THE DRAWINGS

The above and other objects, advantages and features of the present invention will become apparent from the following description when read in conjunction with the accompanying drawings, wherein:

FIG. 2 is a side elevation view of the embodiment of FIG. 1;

FIG. 3 is a side elevation view of the interchangeable cartridges of the embodiment of the FIG. 1;

FIG. 4 is a front elevation view of the cartridge of FIG. 3;

FIG. 7 is an enlarged detailed view of a portion of a cam and locking system for the dispensing trays;

FIG. 8 is a rear elevation view illustrating the wiring diagram connecting the major components of the embodiment of FIG. 1;

FIG. 9 is a top plan view of the key pad and LCD screen of the embodiment of FIG. 1;

DETAILED DESCRIPTION OF THE PREFERRED EMBODIMENTS

Figure 1:
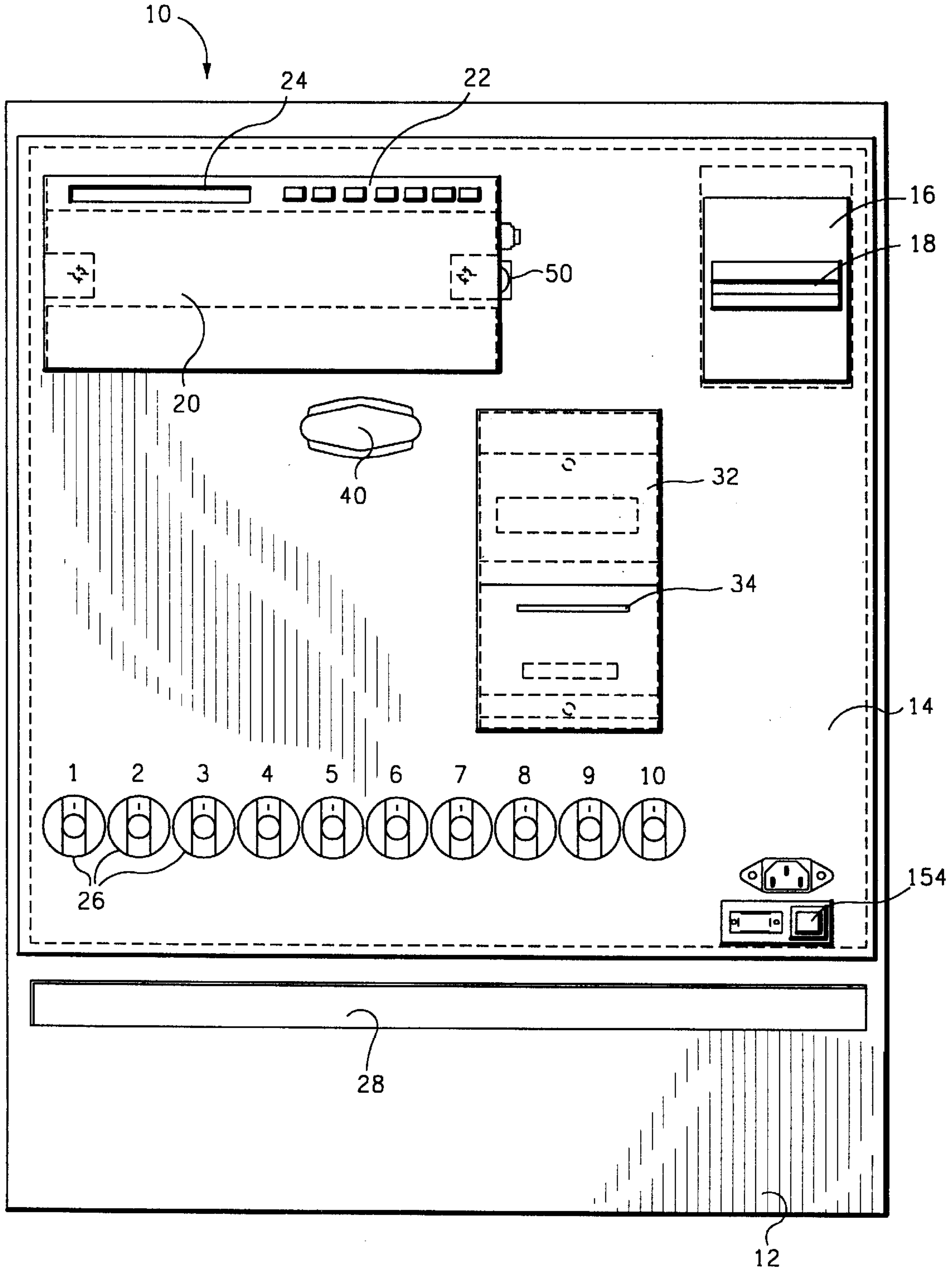
FIG. 1 is a front elevation view illustrating a preferred embodiment of the deposit and dispensing safe of the present invention.

Referring to FIG. 1 of the drawing, a safe embodying a cash management and handling system in accordance with the present invention is illustrated and designated generally by the numeral 10. The safe comprises a generally box-like housing having front, back, side, top and bottom walls forming or defining a secure chamber for safe storage and placement of cash and other securities. The safe in accordance with the invention is equipped with a system having a combination of functions defining a cash management system to enable the safe storage and retrieval of cash for a retail establishment. The illustrated embodiment has a front wall 12 including a door 14 which pivots along an axis at the lower edge thereof to open outward as will be subsequently explained.

Figure 10:
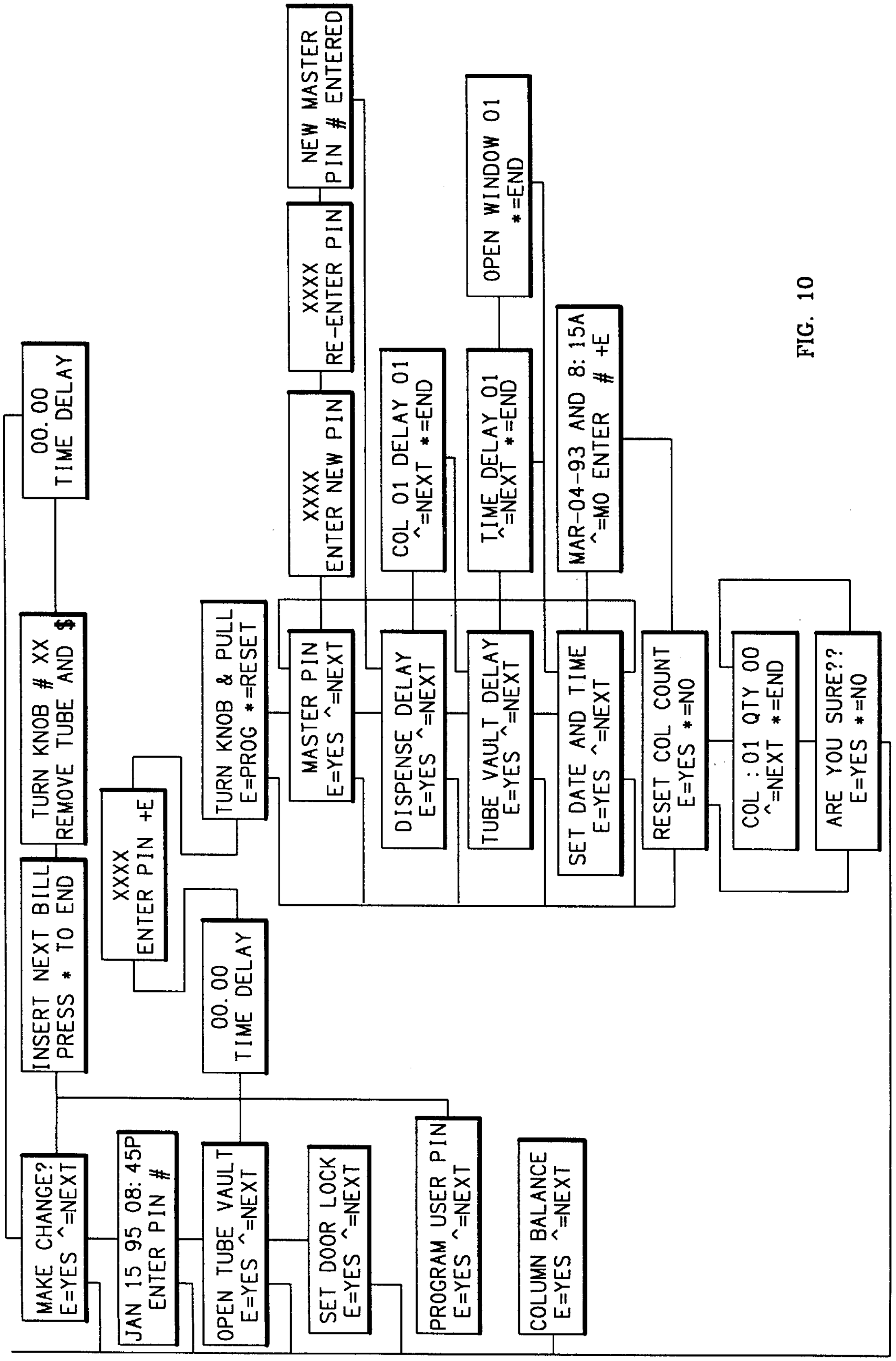
FIG. 10 is a functional block diagram of one embodiment of the invention.

The system embodies cash receiving and dispensing devices, preferably along with a central processing unit (CPU) with software for accounting purposes. In the illustrated embodiment, a currency receiving and validating unit 16 is mounted on the inside of the door and is accessible by way of a bill receiving slot 18 in the front of the door. The bill or paper currency receiving and validating unit is preferably an off the shelf item available from Rowe International Inc. in Rockwell, Tex. under the model number RBA-7, which model is designed to read and validate all denominations of U.S. paper currency up to $100.00. The unit accepts a bill and verifies it as a genuine bill, or rejects it. If the bill is accepted, it is read for its denomination, stashed in a storage box and a signal pulse emitting a credit valuation is initiated. This credit pulse is transmitted to a programmed CPU mounted on a circuit board within the safe which processes the signal. In the embodiment of FIG. 10, the signal activates a dispensing cartridge for dispensing a container containing an equivalent amount of cash, in coins and/or bills of lesser denomination.

A user interface and control panel 20 is mounted on the front of the door and includes a key-pad 22 and LCD screen 24. The keypad comprises a digital input device which enables the programming of the CPU and the entry of codes and commands by individual users. The electronic system provides information and prompts the user on the LCD screen how to select and operate a respective cash dispenser.

Pursuant to the prompts, a respective one of a plurality of dispensing knobs 26, only one of which will be specifically described, is rotated by the operator to selectively dispense a unit of cash 27 into a retrieving tray 28 in the lower part of the safe housing or cabinet. The illustrated embodiment is equipped with a plurality of dispenser cartridges 30 which mount to the back of the safe door inside the safe for containing multiple units of cash of predetermined values for dispensing. The units of cash are cylinders or tubes containing predetermined denominations of cash. In the illustrated embodiment, the system is provided with ten cartridges with each loaded with multiple, such as ten, predetermined units of cash to be dispensed in response to the insertion of a bill. In the FIG. 10 embodiment, if there are no cash units equivalent in denomination to the bill inserted, the bill will be returned to the user. If a cartridge is empty the system will initiate a signal such as an audible buzzing to alert the user. This embodiment was designed primarily to provide change to cashiers. However, the system can be programmed to issue credit and/or dispense other units, as will subsequently be described.

A printer 32 is mounted on the front of the door 14 and connected through the electronics of the system to print reports on paper dispensed through a slot 34. The printer may be any suitable printer such as a Citizens model number MD-910. The printer may be used to print any number of reports desired by the safe operator. The CPU may be programmed to provide desired accounting information via the printer.

Figure 6:
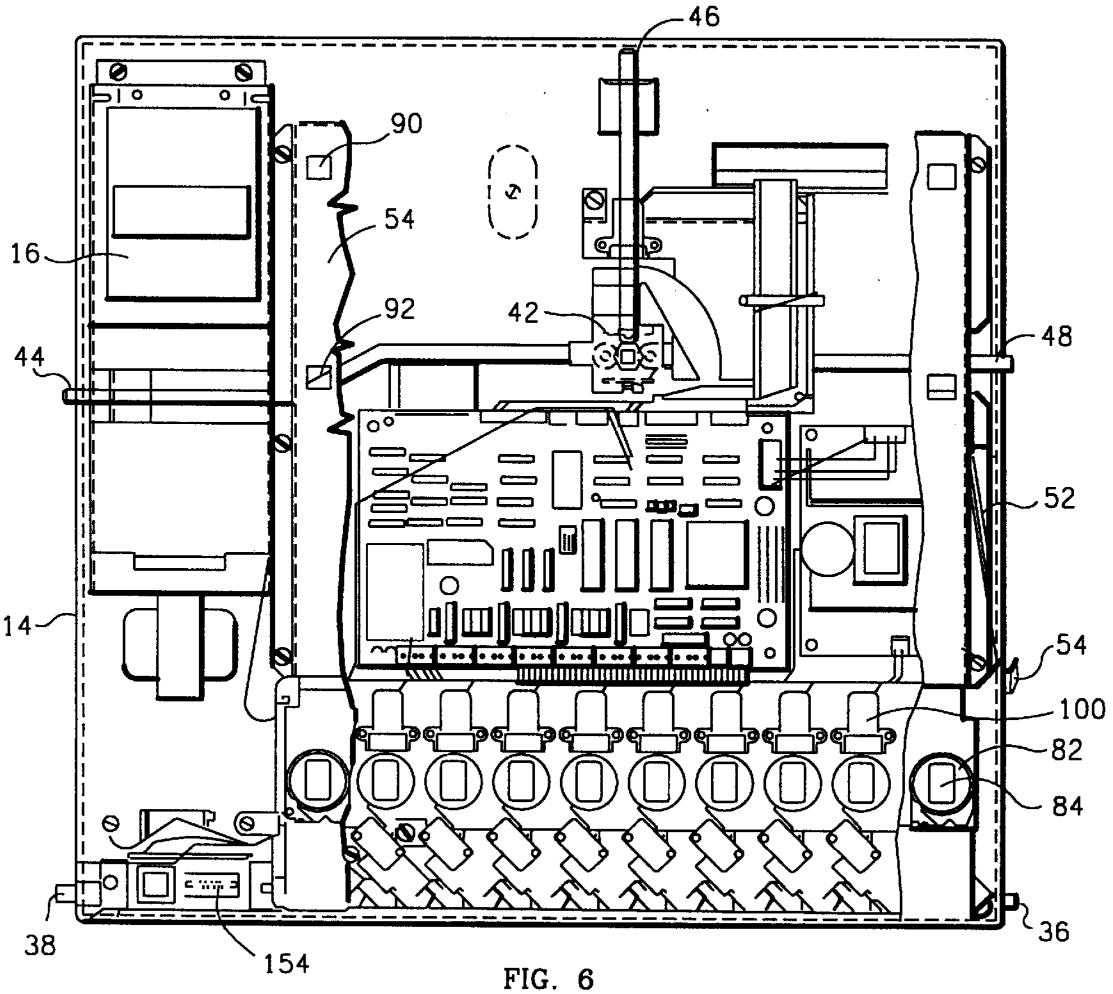
FIG. 6 is a rear elevation view with portions broken away to reveal the major components of the embodiment of FIG. 1.

The door 14 is pivotally mounted, such as by means of a pair of pins 36 and 38 at opposite sides of the lower edge thereof, and pivots forward to provide access to the interior of the safe. A locking system operated by an exterior handle 40 is connected through the door and a linkage plate 42 as shown in FIG. 6 to operate locking bolts 44, 46 and 48 to lock the door in a closed position. The lock system is maintained in the locked stage or condition and may be opened by entering a proper code on the keypad 22 which unlocks a solenoid lock to enable operation of the latch releasing handle 40. A key unlocking system, including a slot at 50 on the user interface panel, enables the opening of the safe should a power failure occur. This back-up system is powered by a suitable dry cell battery.

A safety latch arm 52 is secured to a side of the door 14, as shown in FIG. 2 and includes a hook 54, as shown in FIG. 6 for latching to a side of the safe housing to support the door in a forwardly inclined position. The latch arm prevents the door from falling down against the front of the safe when the lock is released.

Referring now to FIGS. 3 and 4, a dispensing cartridge 30, having a tall, narrow, box-like configuration is illustrated. The cartridge has an open top for receiving a plurality of units of currency, such as coins or bills placed preferably in a plastic tube. The cartridges may be formed of plastic or sheet metal and comprise a forward wall 56 which faces the door in the mounted position, a back-wall 58 and side-walls 60 and 62.

Figure 5:
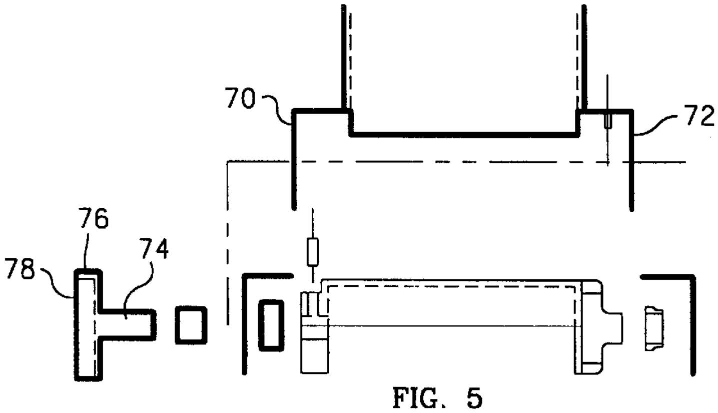
FIG. 5 is an exploded view of the dispensing tray of the cartridge of FIG. 3.

A rotatable dispensing tray 64 formed with a central semi-circular trough configuration with circular ends 66 and 68, as shown in FIGS. 3 and 5, is rotatably mounted in brackets 70 and 72 at the bottom of each dispensing cartridge. One end of the dispensing tray is provided with a rotatable drive-shaft 74, having a coupling disc 76 with a slotted key-way 78 therein. The dispensing tray 64 is normally disposed as shown in FIG. 3 with the top open and aligned with the open bottom of the dispensing cartridge 30 for receiving a tube of currency.

Each dispensing knob 26 as shown in FIG. 2 is rotatably mounted by means of a shaft 80 in the door of the safe and includes cam member 82 with a coupling key 84 for engagement with the coupling key-way 78 on a dispensing tray. Each cartridge is provided with mounting hooks 86 and 88 on the front wall 56 thereof for hooking into mounting slots 90 and 92 on the cover panel 94 on the back of door 14, as shown in FIG. 6. The panel 94 is provided with a pair of hooking slots or mounting slots aligned directly above each of the coupling shafts or keys 84 of each of the dispensing knobs 26. The dispensing cartridges 30 thus may be quickly and easily mounted in and removed from the safe. This enables the cartridges, for security purposes, to be loaded elsewhere and simply and quickly loaded into the safe.

As seen in FIG. 2, a lower portion of a cartridge is illustrated positioned directly above and ready to move down into coupling engagement with a dispensing knob assembly 26. As the cartridge is lowered with the hooks 86 and 88 moving into the mounting slots 90 and 92, the coupling slot or keyway 78 slides down over key 84 establishing a coupling. The cartridge is easily removed by reversing the above procedure. The cartridge is provided with a handle that can be grasped by hand for lifting and carrying it.

The system enables any number or combination of currency units or tubes to be loaded in any number of cartridges and mounted in the dispensing assembly. The CPU of the management system can then be programmed to identify the cash unit value of each cash unit in each of the selective cartridges. Thus, when a cashier inserts a $20 bill in slot 18, the system reads and verifies the bill and, if validated, immediately activates a dispensing cartridge containing cash units of $20 in value. The LED 24 then displays instructions to the operator to select and rotate a specified knob 26 which thereby dispenses a roll containing $20 in certain denominations of cash.

Referring now to FIG. 7, some detail of the cam 82 is illustrated. The cam, as illustrated, includes a latching recess 96 in which a plunger 98 of a solenoid 100 engages to latch the dispensing tray against rotation. When a dispensing cycle is authorized and a given cartridge is enabled, the respective solenoid 100 is activated pulling the latching plunger 98 upward clearing slot 96 and enabling the dispensing tray to be rotated by the dispensing knob 26. The cam 82 also includes cam recesses 102 and 104 which are operative to enable a switch arm 106 on a switch 108 to drop into recess 102. A second identical switch 110 having an actuating arm 112, is mounted directly behind switch 108 as shown in FIG. 7 and directly beside switch 108, as shown in FIG. 2 and includes an arm 112 which drops into recess 104 to open the switch. Sequential actuation of the switches causes the plunger 98 to drop onto the cam 82 to lock the dispensing tray against any more than a single rotation in the tube or change dispensing direction.

Both switches are required to operate in sequence to signal that the dispensing tray has been fully actuated and the cash dispensed therefrom. Failure to rotate the dispensing tray sufficient to dump the cash unit actuates an audible alarm signalling that a tray has not been dispensed. Similarly, failure to rotate the dispensing handle back to the upright position also actuates an audible alarm signaling that the dispensing knob is to be rotated back to the ready position. At this position, the tray receives another unit of currency for dispensing.

Referring to FIG. 8, a wiring diagram for one embodiment of the cash control system is illustrated. This system includes a centrally mounted PC board 114 which has a CPU 116 such as an 8088 microprocessor available from Intel or any other suitable unit. The PC board mounts the usual electronics components for interfacing with the CPU for operating the various components of the system. The bill validating unit 16 has its own transformer 118 and is connected through a plurality of conductors 120 to the input terminals of a power supply unit 122. A series of cables 124 connects the output of the power supply unit 122 to the PC board. As shown in Section AA at the left side of FIG. 8, the bill validating unit 16 is connected to the PC board by suitable conductors 126. A ribbon cable 128 connects the PC board 114 to the printer 32. A ribbon cable of multiple conductors 130 connects the key pad 22 to the PC board. Similarly, the LCD 24 is connected by a ribbon cable 132 to the PC board. Each of the many solenoids 100 for the dispensing cartridges is connected to the PC board by its own conductor combination. Switches 108 and 110 are similarly connected to the PC board by a plurality of cables. The key lock 50 of the power failure back-up system is connected to the circuit board by conductor 134.

Referring to FIG. 10, a system flow diagram illustrates the overall function and operation of a currency in/change out controller operating system. The system can be programmed to operate in a number of different ways to suit the operator. For example, it can provide any delay between dispensing of change from 0–99 minutes. This enables the system to be programmed to frustrate robbery. The system can also be programmed to require input of a personal identification number (PIN) at certain stages of system operation for accounting purposes. This enables the system to be programmed to provide an accounting of cash deposited, received or exchanged by each cashier within the business. It can also be programmed to receive and credit cash or deposits without the necessity of dispensing an equal amount of change. It can be programmed to dispense a certain amount of cash under specified conditions without the deposit of cash. Thus, it can be programmed to operate in a large number of modes.

Figure 11:
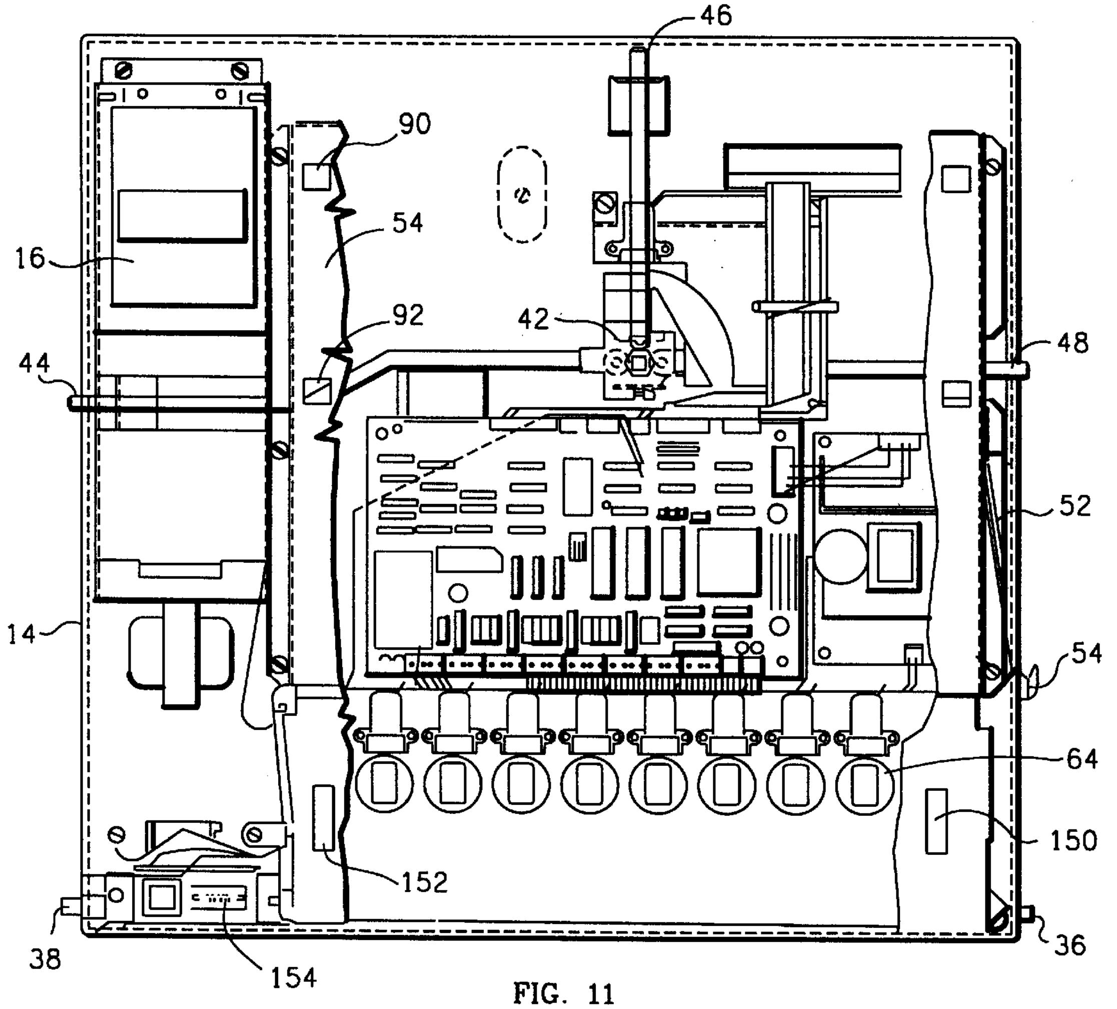
FIG. 11 is a rear elevation view similar to FIG. 6 illustrating an embodiment of the invention incorporating an improved cash dispense detection system comprising a light beam traversing the dispense path and a photocell for detecting interruption of the beam.
Figure 12:
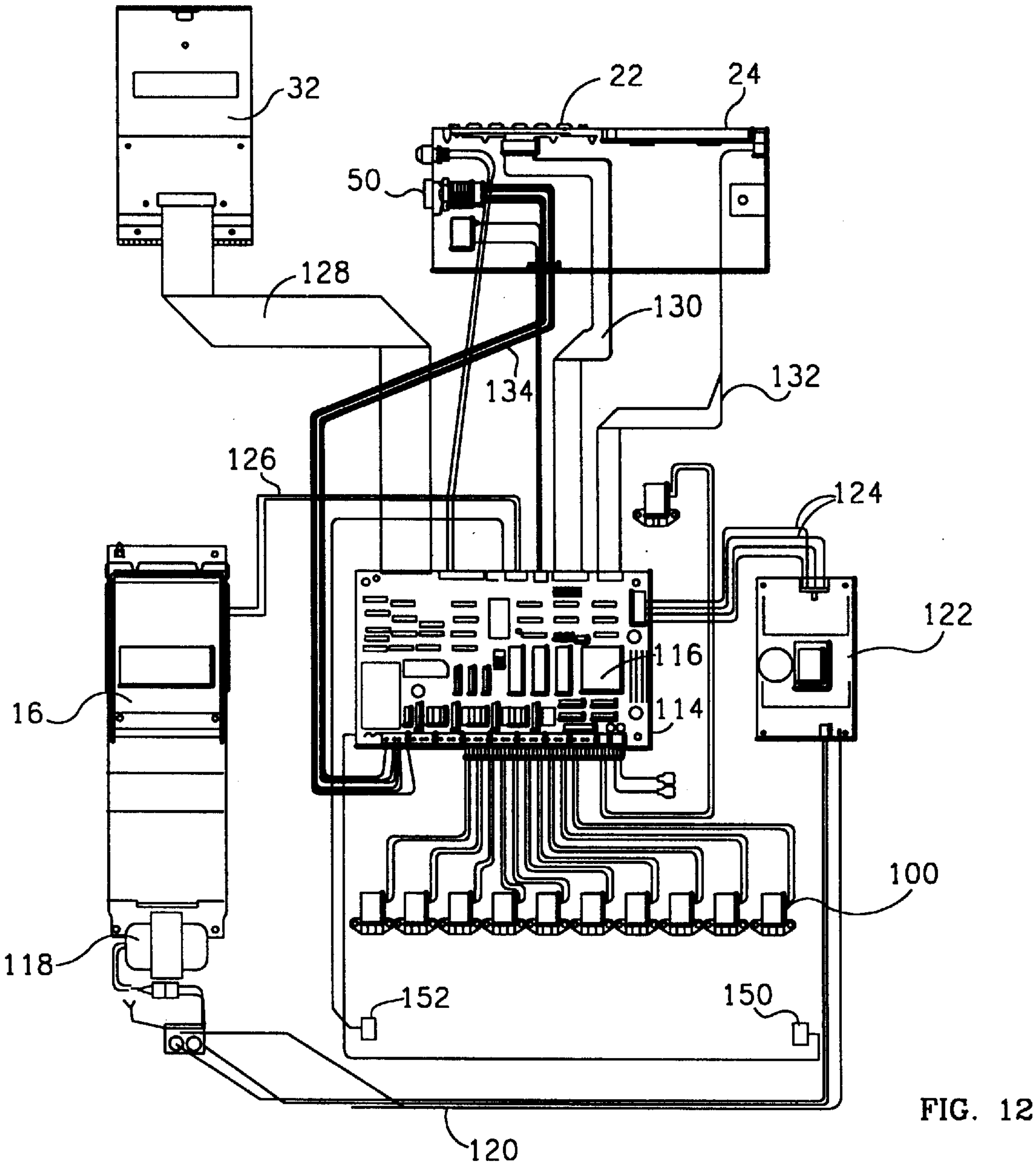
FIG. 12 is a rear elevation view similar to FIG. 8 illustrating the wiring diagram for the embodiment of the invention illustrated in FIG. 11.

Referring now to FIGS. 11 and 12, a second embodiment of the invention is comprised of the same elements as the embodiment of FIGS. 1–10 with the exception that the cam elements 102 and 104 and switches 108 and 110 have been eliminated and replaced by an infrared light beam source 150 and photooptical sensor or photocell 152. In addition, the central processing unit (CPU) 116 has been reprogrammed and the associated software has been extensively upgraded to provide a total cash control and accounting system.

As illustrated in FIG. 11, the infrared light beam source 150 is mounted on the inside of the safe door 14 to one side of and below the cash tube dispensing trays 64 and in a position to direct a beam of light horizontally across the cash tube dispensing assembly immediately below all of the dispensing trays 64, so that the beam of light will be intersected and interrupted by a cash tube 27 dropping out of any one of the trays 64. The photocell sensor 152 is similarly mounted at the opposite side of the dispensing assembly in a position in which it will normally receive and sense the presence of the beam of light, and in turn sense any interruption of the light beam caused by a descending cash tube 27.

Immediately upon sensing an interruption in the light beam, the photocell transmits a signal to the PC board and CPU and they in turn deenergize the solenoid 100 associated with the respective dispensing tray, whereupon the plunger 98 engages the cam 82 and reenters the cam slot 96 thereby preventing dispensing of another cash tube 27, i.e., the dispense cycle is limited to a single tube.

This photooptic dispense detecting system is entirely electronic and eliminates the need for the cams 102–104 and the switches 108–110 and associated wiring, and/or other mechanical or physical systems which are subject to wear, difficult to adjust and maintain, and comprised of many components, e.g., two cam surfaces, two switches and the associated wiring for each of a plurality of cash tube dispensers. The photooptic detecting system 150–152 of the invention is considerably more reliable and far more economical.

In a simple currency-in/equal-change out system, the signal from the bill validator 16 can be processed to energize the appropriate one of the solenoids to permit dispensing of one cash tube 27 containing the proper amount of change. As soon as the tube is dispensed, the dispensing system is deactivated by the signal received from the photocell 152, until another bill is validated.

However, the deposit and dispensing safe of the invention is particularly designed and specifically intended to provide a total cash control system, especially for large retail outlets.

Each person authorized to access the safe is provided with a distinctive PIN number for entry via the keyboard 22. The PIN number will identify the user and the extent of the user's authority, i.e., to deposit only, to deposit bills and receive equal change, to deposit bills and withdraw more or less money within preset limits, to withdraw up to a specified limit, to withdraw any amount, or to have complete access to the safe. Alternatively, or in addition, a Smart Card may be utilized for identification and authorization.

Each time the deposit/dispense system is accessed, the CPU and associated software process a transaction report which is stored in memory. If desired, a printed report of each individual transaction may be obtained from the printer 32 by following appropriate prompts appearing on the LCD screen 24. The report will customarily identify the user, the date, the time and the nature and amount of the transaction, i.e., the amount deposited and/or withdrawn. At any time desired, a print out can be obtained of total deposits and/or the amount of change remaining in each of the cash tube cartridges 30. Periodically, usually at the end of a shift or at day's end, reports can be obtained via the printer of the entire day's transactions, with cumulative totals of deposits and withdrawals, and of the shift or day's transactions by individual user. Preferably, the system is programmed to automatically prepare a "Z" or zero report at the end of each day to insure against the loss of any data.

Also in the preferred embodiment, the system includes an RS-232 or RS-485 input/output communication port or jack 154 coupled to the PC board so that the system can be interfaced with an accounting system or computer for convenient determination of status and preparation of reports. Each of a plurality of the safes can thus be interfaced with the office of the chief cashier or financial officer for supervision and control.

The system further provides for dual security in that it not only supervises and accounts for user transactions, but also supervises and accounts for the transactions of the individual or individuals who load the cash tubes in the cartridges 30 and remove the bills from the validator 16. The cash control system is therefore essentially fail-safe.

Figure 13:
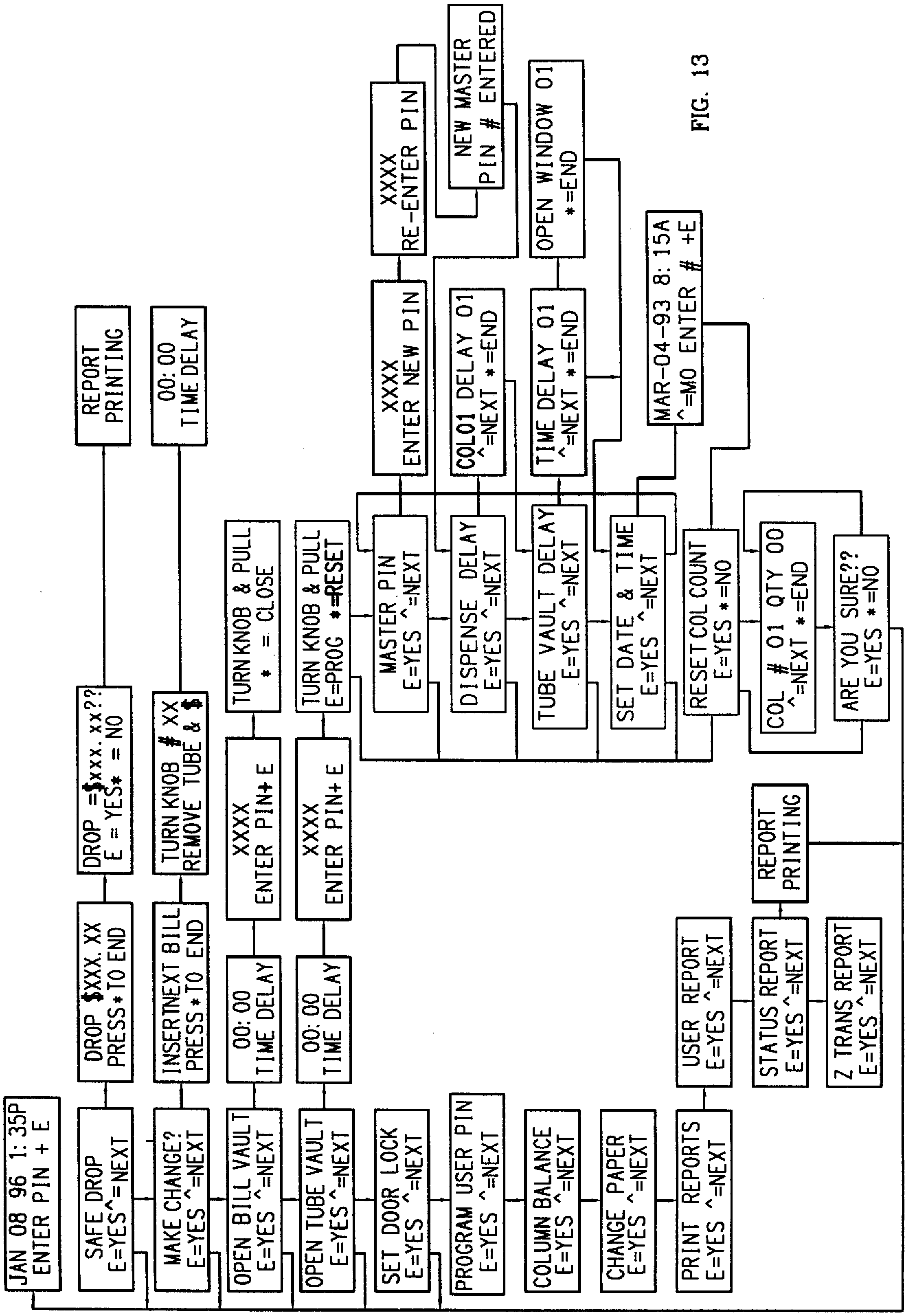
FIG. 13 is a functional block diagram of an embodiment of the invention providing a total accounting and cash control system.

FIG. 13 is a system flow chart illustrating diagrammatically the overall function and operation of the cash control system of the invention. As shown, and as above described, the system is capable of being programmed for various cash control functions including total cash control with all transactions recorded and retrievable, and supported with receipts. Various adjustable time delays can be incorporated for security purposes. Also, and in particular, the system can generate via the printer 32 and/or the communication port 154 any one or more of the following reports: An audit trail, bill deposits by user, bill deposits by denomination, total deposits, cash withdrawals by user, cash withdrawals by respective cartridges, i.e., respective units of cash, total cash withdrawals, chronological transactions by user, total transactions chronologically or otherwise, end of shift examine or "x" reports by individual user, zero or "z" reports, and end of the day balancing reports. In short, a complete cash accounting system is provided.

The features, objects and advantages of the invention have thus been shown to be attained in a convention, economical, practical and facile manner.

While preferred embodiments of the invention have been herein illustrated and described, it is to be understood that various changes, rearrangements and modifications maybe made therein without departing from the spirit and the scope of the invention as defined by the appended claims.

What is claimed is:

1. A self contained total cash control and cash accounting system safe for retail businesses comprising, in combination a generally box-like housing having top, bottom, front, back and side walls forming a chamber comprising a safe for securing cash, said front wall including a movable door for accommodating access to the interior of the safe and a dispense opening to accommodate dispensing of cash from the safe, bill receiving apparatus mounting on the front wall of said housing for receiving and validating bills of various denominations, said apparatus rejecting bills that are not validated, depositing in said safe bills that are validated, and generating a signal proportionate to the denomination of each validated bill deposited in the safe, a storage box in said safe for receiving and stashing validated bills, cash dispensing apparatus noted on said housing and including within said safe a plurality of cash dispensing units each respectively adapted to be loaded with a plurality of cash containers each containing cash of predetermined common value and to dispense said containers one at a time to the exterior of the safe through the dispense opening in the front wall of said housing, each said cash dispensing unit including a cartridge for holding a plurality of cash containers and a dispensing tray movable from a container receiving position to a container dispensing position for dispensing the containers one at a time through said dispense opening, a plurality of manually manipulatable knobs on the front wall of said housing each connected to a respective one of said dispensing trays for manually moving the respective tray from its cash receiving position to its cash dispensing position and back to its cash receiving position, means for detecting, identifying and generating a signal proportionate to the cash value of the cash contained in each container dispensed, a control system in said safe including a CPU programmable for recognition and storage of bill deposit signals and cash dispensed signals, for recognition of user identification data, for carrying out selected functions in response to such identification data, and for storing transactions data, said control system including data input means on the front wall of said housing accessible from the exterior of said safe and coupled to said CPU for inputting individual user identification data and money withdrawal data, said control system upon receipt, recognition and processing of user identification data accommodating in response to said data respective ones of (i) a bill deposit, (ii) a cash withdrawal, (iii) a bill deposit and an equal cash withdrawal, (iv) a bill deposit and an unequal cash withdrawal, or (v) access to the interior of said safe, said control system recording and storing in memory each such transaction and the identity of the individual user who performed the transaction, and means for retrieving transactions data from said control system, said control system and said retrieving means accommodating selective preparation of any one or more of the following reports: an audit trail, bill deposits by user, bill deposits by denomination, total bill deposits, cash withdrawals by user, cash withdrawals by respective units of cash, total cash withdrawals, user access to the interior of the safe by user, chronological transactions by user, total chronological transactions, end of shift exam reports, zero reports, and end of the day balancing reports.

2. A safe as set forth in claim 1, including a latching system for prohibiting operation of the dispensing trays, said control system including means for governing said latching system to prohibit operation of each dispensing tray except upon authorization from said control system and to prohibit operation of a dispensing tray any more than once upon each said authorization.

3. A safe as set forth in claim 2, wherein the latching system comprises cam means on each dispensing tray and a solenoid operated latch associated with each cam means and normally engaged with the respective cam means to latch the respective tray against dispensing movement, each latch being retractable from the respective cam means upon energization of the respective solenoid to accommodate dispensing movement of the tray, and means for detecting the dispensing of a cash container and for thereupon deenergizing said solenoid.

4. A safe as set forth in claim 3, wherein the latching system includes a photooptic light beam system focused to intersect the dispensing path of cash containers dispensed from all of the dispensing trays, and means responsive to interruption of the light beam by a dispensed container for deenergizing the solenoid.

5. A safe as set forth in claim 1, wherein said retrieving means comprises a printer mounted on the front wall of said housing and coupled to said control system for printing and delivering to the exterior of said housing printed transactions data.

6. A safe as set forth in claim 1, wherein said retrieving means comprises a communications port mounted on said housing for access from the exterior of the housing and coupled to said control system for accommodating communication of transactions data from said control system to a remote accounting station or computer.

7. A safe as set forth in claim 2, wherein the latching system includes a photooptic light beam system focused to intersect the dispensing path of cash containers dispensed from all of the dispensing trays and means responsive to interruption of the light beam by a dispensed container for terminating the cash dispensing authorization.

8. A safe as set forth in claim 1, wherein said data input means comprises one or the other or both of smart card means and digital input means.

* * * * *